April 30, 1963   A. J. TEDESCO   3,087,216
UTILITY CABLE SPLICE COVER
Filed Sept. 15, 1959
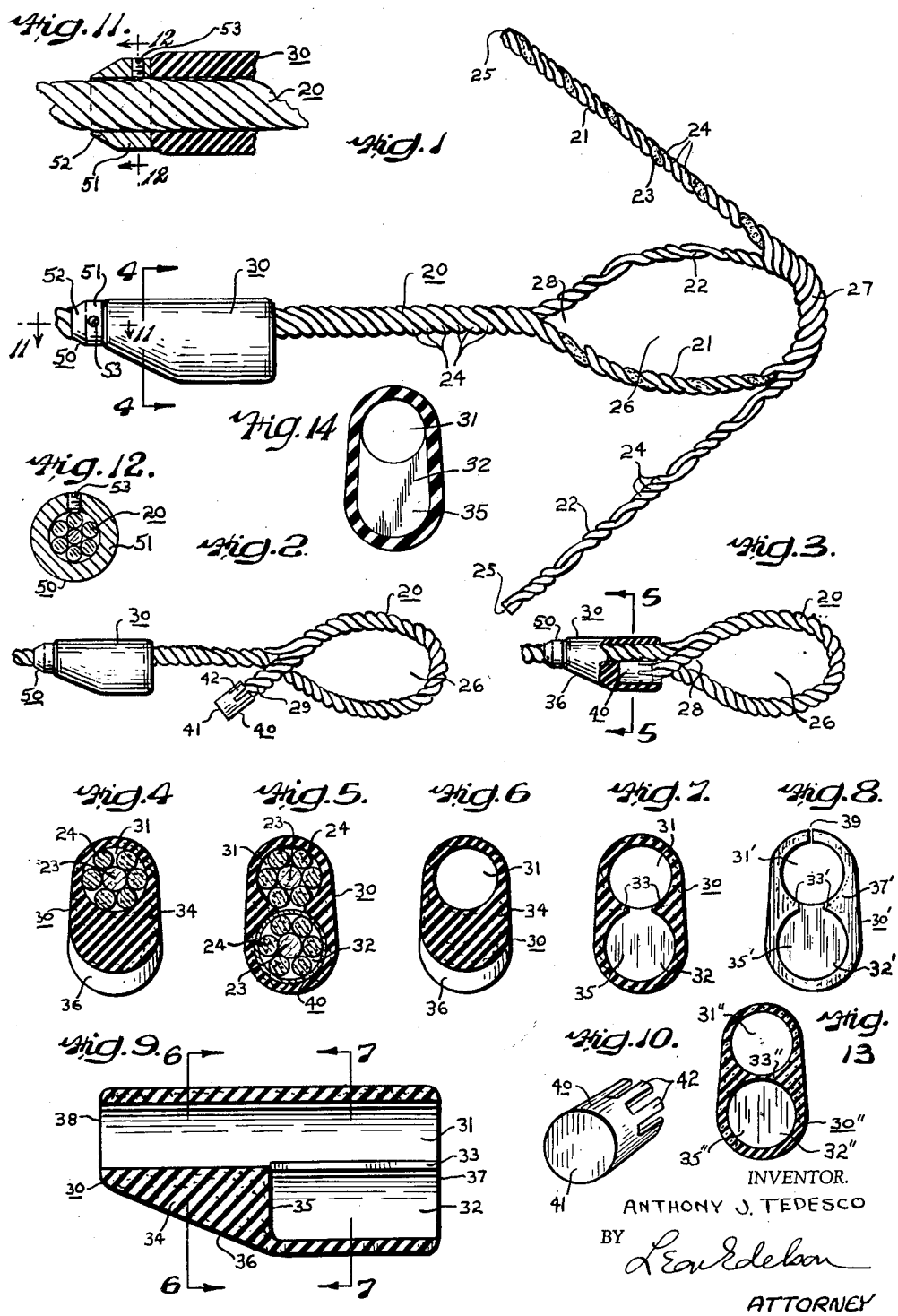
INVENTOR.
ANTHONY J. TEDESCO
BY L. Edelson
ATTORNEY

United States Patent Office 3,087,216
Patented Apr. 30, 1963

3,087,216
UTILITY CABLE SPLICE COVER
Anthony J. Tedesco, Camden, N.J., assignor of one-half to John Goan, Camden, N.J.
Filed Sept. 15, 1959, Ser. No. 840,163
12 Claims. (Cl. 24—123)

This invention is a continuation-in-part of the invention disclosed in my co-pending application for United States Letters Patent Serial No. 780,527, filed December 15, 1958, which has been abandoned, and relates to apparatus for pulling wire or cable through a conduit, and more particularly relates to means for eliminating the problems associated with the use of the so-called utility eye splice formed on the end of the pulling cable.

In the past, a great deal of difficulty has been experienced with the use of the utility eye splice formed on the pulling end of a cable utilized for drawing electrical conductors through underground conduit, as for example during the installation of telephone or power lines. The eye is formed in the end of the pulling cable in a manner which will be specifically described in connection with the several figures, however, in general the eye is formed at the end of the pulling cable in such a way that a short length of cable having a free end results. The free end is then laid over against the straight part of the main cable and is wrapped with several turns of wire to hold it in place. The utility eye splice taking the form just described is fashioned on the job whenever the need arises, and, while resulting in a far from ideal splice, the ability to make such a splice on the job avoids the necessity for having each installation crew carry along a cable splicer which is both heavy and relatively costly.

In use, the sharp strands of the free end of the pulling cable and the wrapping wire which secures the free end against the main part of the pulling cable catch on the conduit walls and in the conduit joints, fray open, and generally provide an impedance to efficient wire pulling. This is particularly true when the eye splice is required to traverse bends and angles in the conduit through which the electrical cable is being drawn. In the relatively frequent instances in which the conduit is formed of tile or wood, such conduits can be gouged and broken, thus allowing water to seep into the inside of the conduit and cause erratic operation and sometimes complete failure of the electrical circuits housed within the conduit. It may be therefore seen that the free end of the pulling cable eye splice constitutes a destructive instrument which gives rise to the need for costly repairs to the conduit itself and to the electrical circuits housed therein. Additionally, when the pulling cable emerges from the conduit at the end of a pulling operation, the frayed open free end must be repaired and rewrapped which renders the installation crew idle while such repairs are being performed. Moreover, the crew member repairing this splice has his hands subjected to cuts and punctures from the sharp wire strands at the free end of the pulling cable adjacent the eye splice.

My invention completely eliminates the foregoing described undesirable results by providing means for preventing the free end of the pulling cable adjacent the eye splice from fraying open, and by providing a novel splice cover for holding the free end close against the main cable and eliminating the possibility of engagement between the butt of the free end and the walls and joints of the conduit. As a result, conduit breakage and attendant water seepage are eliminated, as is the idling of an installation crew because in the latter case the necessity for repairs to the pulling cable is also eliminated. Accordingly, it is a primary object of my invention to provide a novel splice cover which prevents conduit breakage and eliminates the necessity for time consuming repairs to the pulling cable.

Another object of my invention is to provide a novel splice cover which is exceedingly tough and durable, inexpensive, and easy to install.

Still another object of my invention is to provide a novel splice cover which is resilient so that it may readily flex and easily traverse the bends and angles sometimes encountered in conduit runs.

Yet another object of my invention is to provide a novel splice cover which remains in place during use and exhibits no tendency to detach itself from the pulling cable.

A further object of my invention is to provide a novel splice cover assembly including means for insuring that the splice cover itself is not susceptible to dislodgment from its operative position when the pulling cable is initially drawn through the conduit, eye first, preparatory to pulling the electrical cable therethrough in the opposite direction.

Another object of my invention is to provide a novel splice cover which provides protection to personnel against receiving cuts and punctures from the sharp wire strands at the free end of the pulling cable by encasing such free end in a tough sheathing.

These and other objects of my invention, will become apparent from the reading of the following specification when taken in conjunction with the appended drawings, wherein:

FIGURE 1 illustrates the method of forming an eye splice at the end of a pulling cable, and also shows in elevation a side view of the novel splice cover and retaining sleeve;

FIGURE 2 illustrates the completed eye splice shown in the process of formation in FIGURE 1 and further shows an end cap or thimble slipped over the free end of the pulling cable;

FIGURE 3 illustrates the capped free end laid over against the main length of the pulling cable and the splice cover shifted towards the eye to secure the free end in its working position;

FIGURE 4 illustrates a cross-section through the splice cover and pulling cable as taken and viewed along the lines 4—4 of FIGURE 1;

FIGURE 5 illustrates a cross-sectional view taken along the lines 5—5 of FIGURE 3;

FIGURE 6 illustrates a cross-sectional view taken along the lines 6—6 as viewed in FIGURE 9;

FIGURE 7 illustrates a cross-sectional view taken through the splice cover of FIGURE 9 as viewed along the lines 7—7 therein;

FIGURE 8 illustrates an end elevation of a modified splice cover similar to the splice cover shown in the other figures;

FIGURE 9 illustrates a central vertical section taken through the splice cover shown in FIGURE 1, but with the cable removed therefrom;

FIGURE 10 shows a perspective view of the end cap or thimble also seen in FIGURES 2 and 3;

FIGURE 11 illustrates a fragmentary horizontal section taken through the retaining sleeve and part of the splice cover and cable shown in FIGURE 1 as viewed along the lines 11—11 therein;

FIGURE 12 illustrates a cross-section taken through the cable and retaining sleeve as viewed along the lines 12—12 of FIGURE 11;

FIGURE 13 illustrates a cross-sectional view of a modified splice cover taken at a point similar to that for FIGURE 7; and FIGURE 14 illustrates a cross-sectional view of another modified splice cover taken at a point similar to that for FIGURE 7.

In the several figures, like elements are denoted by like reference numerals.

Turning now to an examination of the figures, and firstly to the showing of FIGURE 1, there will be seen a cable 20 composed of six stranded sections 24 arranged in a circle when viewed in cross-section and having a central core 23, a sheath 30, and a retaining sleeve 50. Each section 24 of the cable is formed from a plurality of wire strands twisted together, and the six cable sections are spirally laid adjacent each other and about the central core 23 which may be formed from a fiberous or other material. The relative arrangement of the individual cable sections 24 and the central core 23 may be best seen in the showings of FIGURES 4 and 5. Such a cable construction is typical of the cables used for pulling electrical conductors through conduits, and it is at the end of this cable that the eye splice is formed.

In order to form the eye splice at the end of the cable 20, the following procedure is followed. Firstly, the cable 20 is divided from the end 25 into two standings portions 21 and 22. The portion 22 includes three sections 24 of the cable 20, and the portion 21 includes three sections 24 and the central core 23. The separation of the cable 20 is achieved by unwrapping three adjacent sections 24 from the remaining part of the cable, care being exercised not to disturb the lay of the sections 24 relative to each other within each of the standing portions 21 and 22. Next, an over-hand loop is formed from the standing portions 21 and 22 in such a way that the cable sections 24 are laid back into nesting position with each other as shown at 27, thus forming the eye 26. The standing portion 22 is then laid back around that part of the portion 21 which forms the bottom of the eye 26 until the root 28 of the eye 26 is reached, the remaining part of the standing portion 22 extending back adjacent the main part of the cable 20.

Similarly, the standing portion 21 is laid back around that part of the portion 22 which forms the upper part of the eye 26 until it also passes the root 28 and extends backward adjacent the main part of the cable 20. The backward extending ends of the standing portions 21 and 22 lying adjacent the main portion of the cable 20 are then interlaid with one another to form a free standing end 29, as best illustrated in the showing of FIGURE 2. It is this free standing end 29 which is normally laid over close adjacent the main part of the cable 20 and wrapped with several turns of wire that creates the problems and difficulties formerly pointed out.

It is helpful, although not essential, that the free end 29 be slipped into an end cap or thimble 40 for the purpose of preventing the ends of the wire strands which form the cable from separating and gouging the inside of the sheath 30 which will be subsequently described. The end cap 40 is best illustrated in the showing of FIGURE 10 where it can be seen that it is of generally hollow cylindrical form closed at one end by the face 41 and provided at its opposite end with a plurality of longitudinally extending circumferentially spaced fingers 42. This end cap 40 may be formed from any convenient material such as plastic or cardboard, or of relatively thin sheet metal. When the end cap 40 is made of a deformable sheet metal the fingers 42 may be crimped inward to engage the circumference of the cable and insure the retention of the end cap 40 over the butt 25 of the free end 29.

The free end 29, as best seen in the showing of FIGURE 3, is now laid over against the main part of the cable 20, the sheath 30 is forced forward toward the root 28 of the eye 26 to thereby enclose the free end 29 and hold it securely in position, and the retaining sleeve 50 is slipped forward into abutment with the tapered end of the sheath and secured to the cable, thereby precluding dislodgement of the sheath from the cable butt end 25 when in use. The specific construction of the sheath 30 is most clearly illustrated in the showings of FIGURES 6, 7 and 9, to which reference should now be made.

The sheath 30 is observed to be of modified rectangular shape when viewed from the side and to be of a generally ovaloid shape when viewed in section, as for example when viewed along the lines 7—7 of FIGURE 9. The departure from rectangularity, as viewed from the side, resides in the tapered wall 36 which extends from the rear face 38 of the sheath 30 forwardly for substantially half the length of the sheath. The purpose of this tapering surface 36 is to smoothly transform the doubled cable of FIGURE 5 to the single cable to the left of the sheath 30 as seen in FIGURES 1, 2 and 3. By thus providing a smoothly changing cross-section, the normally exposed butt 25 of the free end 29 is prevented from coming into snagging engagement with the walls or joints of the conduit.

It will, of course, be understood that the tapered wall 36 need not correspond to half of the total sheath length, but may be some other fraction thereof, as for example one-third of the length. In fact the relative proportions are not interdependent, the tapered portion length being chosen to provide a not too abrupt transition, and the straight portion being chosen to provide sufficient length to allow the butt 25 to shift longitudinally without coming free of the bore 32 (described infra) when the splice cover flexes while traversing bends and angles in the conduit run.

Extending longitudinally through the sheath 30 is an open ended bore 31 of slightly smaller diameter than that of the cable 20, so that the sheath 30 which is made of a resilient material such as rubber, snuggly grips the cable throughout the full extent of the bore 31. Immediately below the bore 31 is a second bore 32 which extends from the front face 37 of the sheath 30 rearwardly and parallel to the upper bore 31 for a distance approximately equal to half the length of the sheath 30 and terminates at a face 35, the sheath 30 between the face 35 and the rear surface 38 being solid rubber as designated at 34.

Vertically centrally located and extending laterally inward from the sides of the sheath 30 are a pair of lips 33 which extend longitudinally the length of the bore 32, and define throughout their extent the bottom surface of the upper bore 31 and the upper surface of the lower bore 32. As seen in FIGURE 7 these lips 33 are separate from one another and are not centrally joined so that the bores 31 and 32 communicate with one another. This aperture between the lips 33 is somewhat arbitrary insofar as the sheath 30 is concerned and could just as readily be bridged straight across to form a web 33" to isolate the bores 31" and 32" of the sheath 30" from each other as shown in FIGURE 13. In either case, the lips or the web exert a frictional bind on the cable and help to prevent sheath slippage. Alternatively, the lips 33 may be completely dispensed with and the sides of the bores 31 and 32 could be smoothly joined and thus define an ovaloid opening substantially concentric with and geometrically similar to the outer periphery of the sheath when viewed in cross-section taken at a point similar to that taken along the line 7—7 of FIGURE 9 as is seen for example in FIGURE 14.

In addition to rubber, the sheath 30 may also be fabricated from any other high durability resilient material, such alternative materials being presently well known in the plastics art. The resilient nature of the material used to fabricate the sheath not only provides the cable-gripping quality of the bores 31 and 32, but also, and more importantly, imparts to the sheath the ability to flex while traversing conduit bends, and thus avoids the possibility that the sheath itself may become wedged therein. Moreover, the particular shape of the sheath 30 illustrated in the several figures need not be strictly adhered to, but other shapes which provide a transition section performing the same function as the section 34 of the illustrated sheath may be just as readily utilized, the principal concept residing in a smoothly changing transition section which eliminates the longitudinal discontinuity occasioned by the butt 25 of the free end 29. As in the case of the bore 31 the bore 32 is of a diameter somewhat smaller than the diameter of the end cap encased free end 29, so that the walls of the bore 32 snugly engage the end cap and free end. In fabricating the finished eye splice as seen in FIGURE 3, the retaining sleeve 50 and sheath 30 may be first slipped onto the cable 20 before the standing portions 21 and 22 are separated out of the cable, or alternatively, the sheath 30 and retaining sleeve 50 may be slipped onto the cable 20 from the opposite end.

Turning now to the view of FIGURE 8, there is seen a sheath 30' similar to the previously described sheath 30 in all regards except one. The sole difference between the sheath 30' and the aforegoing described sheath 30 resides in the fact that the sheath 30' includes a longitudinally running slit 39 extending the full length of the bore 31', the latter corresponding of course to the bore 31 of the sheath 30. The purpose of the slit 39 is to allow installation of the sheath 30' onto a cable 20 by opening the bore 31' and slipping the cable 20 laterally thereinto through the slit 39. A sheath 30' so constructed may be used for replacement of an original sheath 30 which has become worn through extended use. Obviously, a sheath 30 without such slit 39 could not be installed on an already formed eye splice. The sheath 30' illustrated in FIGURE 8 therefore permits rapid changing of splice covers with practically no loss of working time for an installation crew. Upon replacement of a sheath 30 with a new sheath 30' the slit 39 may be permanently closed with a piece of rubber-bonding tape and the pulling cable may be used immediately.

Turning now finally to an examination of FIGURES 11 and 12 which show in section the details of the retaining sleeve 50, it is seen that the sleeve is of hollow tubular form having a forward portion 51 of constant cross-section and an axially tapered rear portion 52 of radially diminishing cross section, both portions being centrally apertured to permit passage of the cable 20 therethrough. The outer diameter of the portion 51 is approximately the same as or slightly smaller than the rear surface 38 of the sheath 30 against which it abuts, and thus effects a continuation of the sheath. The tapered portion 52 is of the same outer diameter as that of the portion 51 where the two merge, but diminishes radially as it recedes from the junction to an outer diameter only slightly larger than that of the cable 20. This, of course, reduces even further the slight discontinuity between the cross-sectional area of the cable 20 and the area of the sheath rear surface 38.

The forward portion 51 is provided with a drilled and tapped aperture extending radially through the wall thereof for receiving a set screw 53. When the sheath 30 has been shifted into operative position, the sleeve 50 may be moved along the cable 20 into abutment with the sheath, as shown, and the set screw may then be tightened down against the cable to lock the sleeve and cable together and prevent rearward shift of the sheath 30 when in use. The retaining sleeve 50 is preferably formed from a strong rigid material such as steel, although other substances may be also considered suitable.

Although my invention has been described in connection with a particularly illustrated embodiment thereof as shown in the appended drawings, it is to be understood that many changes and modifications suitable for particular purposes will now naturally occur to those persons normally skilled in the art and without departing from the scope or essential spirit of my invention, and it is therefore intended to claim my invention broadly as well as specifically as indicated by the appended claims.

What is claimed as new and useful is:

1. A dimensional transformer for converting an abruptly changing cross-sectional area into a gradually changing cross-section exihibiting no physical discontinuity comprising, a unitarily formed resilient sheathing including a portion having a pair of longitudinally extending bores the axes of which are disposed in parallel relationship, a first one of said bores being of lesser axial extent than the second of said bores so as to define a cross-sectional discontinuity at some point transverse to and along the axis of said second bore, and a solid, unbored portion of gradually decreasing cross-section extending along said second bore from said discontinuity toward an end of said second bore which is remote from said first bore, the maximum cross-section of said solid unbored portion lying adjacent to said discontinuity, said resilient sheath material being apertured between the said bores so that the latter intercommunicate with one another.

2. The dimensional transformer according to claim 1 wherein the aperture between said intercommunicating bores extends substantially the full length of said first bore.

3. The dimensional transformer according to claim 2 wherein said aperture is of a width substantially equal to the mean diameter between said first and second bores.

4. A splice cover for sheathing the free-end of a pulling cable eye-splice and preventing the butt from damaging the conduit through which the cable is pulled comprising, a resilient sheathing having a portion provided with a first bore extending longitudinally completely therethrough and through which a length of the main part of the pulling cable adjacent to the root of the eye-splice may be disposed with the bore walls snugly engaging the cable periphery, and with a second bore open at the sheath end adjacent to the root of the eye-splice, extending for a distance into the body of the sheathing and dead-ending therein, said second bore being adapted to receive the free-end of the eye-splice and snugly engage the periphery thereof while simultaneously holding the free-end closely adjacent to the main part of the pulling cable, and a solid, unbored portion defining said second bore dead-end and extending therefrom alongside said first bore toward the sheath end remote from the root of the eye-splice, said solid unbored portion decreasing smoothly in cross-sectional area as it recedes from the region of said second bore dead-end, and said sheathing being slit through to provide an opening into said first bore which extends longitudinally the full length of the latter.

5. The splice cover according to claim 4 wherein said first and second bores are circular in cross-section and have their longitudinal axes disposed in parallel relation.

6. The splice cover according to claim 5 wherein said sheathing is of ovaloid cross-section throughout the region of parallel extent of said first and second bores and is of circular cross-section at the sheath end remote from the root of the eye-splice, and wherein said solid unbored section smoothly transforms the ovaloid cross-section to the circular cross-section.

7. The splice cover according to claim 6 wherein the sheathing walls defining said first and second bores also define a sheath cross-section minimally larger than the cross-sectional area of the cable designed to be accommodated within said bores.

8. A splice cover assembly for sheathing the free-end of a pulling cable eye-splice and preventing the butt from damaging the conduit through which the cable is pulled comprising, a resilient sheathing having a portion provided with a first bore extending longitudinally completely therethrough and through which a length of the main part of the pulling cable adjacent to the root of the eye-splice may be disposed with the bore walls snugly engaging the cable periphery, and with a second bore open at the sheath end adjacent to the root of the eye-splice extending for a distance into the body of the sheathing and dead-ending therein, said second bore being adapted to receive the free-end of the eye-splice and snugly engage the periphery thereof while simultaneously holding the free-end closely adjacent to the main part of the pulling cable, and a solid, unbored portion defining said second bore dead-end and extending therefrom alongside said first bore toward the sheath end remote from the root of the eye-splice, said solid, unbored portion decreasing smoothly in cross-sectional area as it recedes from the region of said second bore dead-end, and a tubular sheath retaining sleeve disposed in end abutting relation with the sheath end remote from the root of the eye splice, the opening through said tubular sleeve being substantially coaxial with said sheath first bore and of the same diameter so that the main part of the pulling cable may be disposed therethrough, said tubular sleeve further including means for locking said sleeve to the pulling cable when a part of the latter is disposed within the sleeve opening, whereby said sheath may be prevented from shifting along the cable away from the eye-splice.

9. The splice cover assembly according to claim 8 wherein said retaining sleeve end and sheath end which abut one another are substantially the same in configuration and cross-sectional area so that the sleeve effects a continuation of the sheath, and the sleeve cross-sectional area smoothly decreases from a point thereon axially spaced from the abutment toward the sleeve end remote from the abutment.

10. The splice cover assembly according to claim 8 wherein said means for locking said sleeve to the pulling cable comprises a rotatable set screw disposed within a threaded hole extending radially through the sleeve wall and adapted to advance through said hole for projection into the hollow tubular interior.

11. The splice cover according to claim 8 wherein said sheathing is of ovaloid cross-section throughout the region of parallel extent of said first and second bores and is of circular cross-section at the sheath end remote from the root of the eye-splice, and wherein said unbored section smoothly transforms the ovaloid cross-section to the circular cross-section.

12. A dimensional transformer for converting an abruptly changing cross-sectional area into a gradually changing cross-section exhibiting no physical discontinuity comprising, a unitarily formed resilient sheathing including a portion having a pair of longitudinally extending bores the axes of which are disposed in parallel relationship, a first one of said bores being of lesser axial extent than the second of said bores so as to define a cross-sectional discontinuity at some point transverse to and along the axis of said second bore, and a solid, unbored portion of gradually decreasing cross-section extending along said second bore from said discontinuity toward an end of said second bore which is remote from said first bore, the maximum cross-section of said solid unbored portion lying adjacent to said discontinuity, said first bore being open at one end with the closed end thereof defining the location of the said cross-sectional discontinuity, said second bore being open at both ends, and said sheath being slit through one wall thereof for the length of said second bore to provide an opening between said second bore and the sheath exterior.

References Cited in the file of this patent

UNITED STATES PATENTS

| | | |
|---|---|---|
| 2,182,446 | Nelson | Dec. 5, 1939 |
| 2,225,865 | Harris | Dec. 24, 1940 |
| 2,561,487 | Bailhe | July 24, 1951 |

FOREIGN PATENTS

| | | |
|---|---|---|
| 525,171 | Canada | May 15, 1956 |
| 19,154 | France | July 4, 1914 |
| | (Addition to No. 462,428) | |
| 562,489 | France | Sept. 6, 1923 |
| 1,160,841 | France | Mar. 10, 1958 |
| 530,809 | Germany | Aug. 1, 1931 |
| 807,779 | Germany | July 5, 1951 |